(12) United States Patent
Long et al.

(10) Patent No.: US 6,488,495 B1
(45) Date of Patent: Dec. 3, 2002

(54) LANTERN WITH IMPROVED CHOKE

(75) Inventors: Norris R. Long, Wichita, KS (US); Randall L. May, Andover, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/637,435

(22) Filed: Aug. 11, 2000

Related U.S. Application Data

(63) Continuation-in-part of application No. 09/525,284, filed on Mar. 15, 2000, now Pat. No. 6,378,551.

(51) Int. Cl.⁷ .............................. F23N 5/00; F23Q 3/00
(52) U.S. Cl. ..................... 431/258; 431/255; 431/62; 431/6; 431/110
(58) Field of Search ................... 431/100, 108, 431/109, 110, 258, 259, 264, 254, 255, 256, 153, 354, 344, 123, 62, 6; 137/505, 505.42, 335, 614.02, 614.13, 614.2; 362/159, 179

(56) References Cited

U.S. PATENT DOCUMENTS

| | | | |
|---|---|---|---|
| 2,465,572 A | 3/1949 | Bramming | 431/344 |
| 3,694,134 A * | 9/1972 | Ross | 431/255 |
| 3,770,363 A * | 11/1973 | Friedrich | 431/255 |
| 3,941,554 A | 3/1976 | Curtis | 431/109 |
| 4,099,538 A | 7/1978 | Curtis | 137/505.42 |
| 4,110,065 A * | 8/1978 | Fujiwara | 431/255 |
| 4,186,760 A | 2/1980 | Hastings | 431/123 |
| 4,502,465 A * | 3/1985 | Yoshinaga et al. | 431/344 |
| 4,522,582 A | 6/1985 | Curtis | 431/123 |
| 4,643,671 A * | 2/1987 | Yoshinaga | 431/255 |
| 4,870,314 A | 9/1989 | Hefling | 431/255 |
| 5,803,727 A | 9/1998 | Long | 431/247 |
| 5,899,229 A * | 5/1999 | Farnham | 431/255 |
| 5,902,100 A | 5/1999 | Long | 431/255 |
| 5,915,955 A * | 6/1999 | Lin | 431/344 |

OTHER PUBLICATIONS

Markill Stove Astro Lantern #69210 catalog p., Jun. 13, 2000.

* cited by examiner

*Primary Examiner*—Henry Bennett
*Assistant Examiner*—Josiah C. Cocks
(74) *Attorney, Agent, or Firm*—Leydig, Voit & Mayer, Ltd.

(57) ABSTRACT

A gas operated lantern includes a control mechanism whereby a user may start gas flow through the lantern, operate a choke, and ignite the lantern. The user may perform these operations using the same control in an easy, simple series of motions. The user may rotate a knob, rotating a stem, to start gas flow and press the knob axially inward along the stem to operate a choke and an igniter.

17 Claims, 5 Drawing Sheets

LANTERN WITH IMPROVED CHOKE

RELATED APPLICATIONS

The present application is a continuation-in-part of U.S. patent application Ser. No. 09/525,284, entitled, "LANTERN WITH IMPROVED CHOKE AND REGULATOR", filed Mar. 15, 2000 now U.S. Pat. No. 6,378,551

FIELD OF THE INVENTION

The present invention relates to gas burning lanterns. In particular, the present invention relates to a gas burning lantern with an improved regulator and an improved choke.

BACKGROUND INFORMATION

A conventional gas burning lantern may include a refillable fuel storage tank, a fuel delivery apparatus, and a burner attached to the fuel delivery apparatus. The fuel delivery apparatus may include a regulator and other equipment, such as an operator gas flow controller or tubing. The burner may include a mantle which, when ignited with a fuel/air mixture provided by the fuel delivery apparatus, emits a bright light. The mantle in such a lantern contains a catalyst, such as yttrium-oxide, which converts the heat from the flame into light. The burner may be covered by a transparent glass globe. Fuel used with such lanterns may include LPG, liquid propane or butane.

The regulator in such a lantern accepts gas from a gas source and provides a steady, controlled gas stream as an output. The regulator or another mechanism mixes air with the gas flow to produce an air/fuel mixture. In order to control and regulate gas flow, a valve allowing gas to flow through the regulator may be closed or narrowed as gas pushes against a diaphragm assembly in the regulator. The narrowing of the valve lowers the gas flow through the regulator, lowering the pressure on the diaphragm and thus allowing the valve to open somewhat. As gas initially flows, an equilibrium is quickly established where the diaphragm accepts a certain amount of gas pressure and in turn allows the valve to open a certain amount. Thus a regulated gas flow of relatively constant pressure may be produced. A regulator may have a control mechanism allowing a user to stop the flow of gas through the regulator in order to turn the lantern on or off. Such mechanisms engage the diaphragm assembly or another portion of the regulator to open or close the valve in the regulator.

A conventional regulator may allow gas to enter through a passage and then to leave the regulator through a passage which is more or less at a 90 degree angle from the entry passage. Thus, in such a regulator, gas may not exit the regulator travelling in the same direction as which it entered (for example, entering the regulator through the bottom and leaving through the top), as the diaphragm assembly provides a barrier around which gas cannot flow. This may dictate an awkward component arrangements. To allow for a better arrangement of components, it is desirable to have gas exit the regulator in the same direction which it entered. Alternately, the gas may exit in the same direction as which it entered, but may travel in a circuitous path or have its path shifted, due to the barrier of the diaphragm. This, too, may result in an undesirable arrangement of components.

Some regulator designs allow gas to flow straight through the regulator, in the same direction which the gas enters, by including a tube or opening through the diaphragm assembly. Gas then may flow up through the regulator. However, such regulators either lack control mechanisms allowing the user to regulate the flow of gas or include awkward control mechanisms. For example, an arm may connect to the diaphragm assembly to allow a user to turn the flow of gas on or off. The arm extends out of the regulator and out of the lantern, and swings in a semi-circle as it is turned around the side of the lantern. Such a design has a large profile and is awkward, as the swing of the arm takes up a large amount space. Other designs have control mechanisms separate from a diaphragm assembly or separate from a regulator. Such extra equipment adds to the complexity and expense of the lantern.

The mantle in a conventional lantern is most efficient at producing light when operating at relatively high temperatures. The lantern flame burns hotter with leaner air/fuel mixtures; i.e., with higher air/fuel ratios. However, leaner gas mixtures are harder to light, particularly when a lantern is cold, and particularly if a mechanical lighting mechanism (e.g., an igniter and spark wire) is used rather than an open flame from a match. A richer air/fuel mixture allows for easier lighting, but is less efficient.

The air/fuel mixture may actually get richer after the lantern heats up. The amount of gas flowing from the lantern's gas tank to the mantle may remain constant over various operating conditions. However, the amount of air entering the system to mix with the gas is affected by the pressure in the system. A flame operating in a hot lantern may cause back pressure through the system, lowering the amount of air entering the lantern and creating a richer mixture.

Current designs attempt to solve the problem of providing a lantern which is both efficient and easy to light in various manners. Certain lanterns set the air/fuel mixture at an intermediate level which allows relatively easy lighting but which also allows for reasonable efficiency. Such a solution is imperfect, as the lantern is neither optimally efficient nor optimally easy to light. Other lanterns include a user operated choke which allows a user to alter the air/fuel mixture so that it is rich on lighting and lean during operation. Such chokes may require a separate control from the control used to operate the gas flow and the control used to operate the lighter which lights the lantern, requiring more equipment and expense, more complicated equipment, and requiring more and more complex user action during lighting. Such chokes may require two hands to operate.

It is desirable to have a regulator which allows gas to exit the regulator in the same direction which it enters (e.g., through the top of the regulator) and in addition which has a simple, easy to use, low profile, low cost, integral mechanism for allowing a user to control the flow of gas through the regulator. It is desirable to have a choke and ignition mechanism in a gas lantern which is simple and easy to operate, and which allows for one handed operation.

SUMMARY OF THE INVENTION

A gas operated lantern includes a control mechanism whereby a user may start gas flow through the lantern, operate a choke, and ignite the lantern. The user may perform these operations using the same control in an easy, simple series of motions. Preferably, the user rotates a knob, rotating a stem, to start gas flow and presses the knob axially inward along the stem to operate a choke and an igniter.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features may be omitted or simplified in the specification in order not to obscure the present invention.

Figure 1:
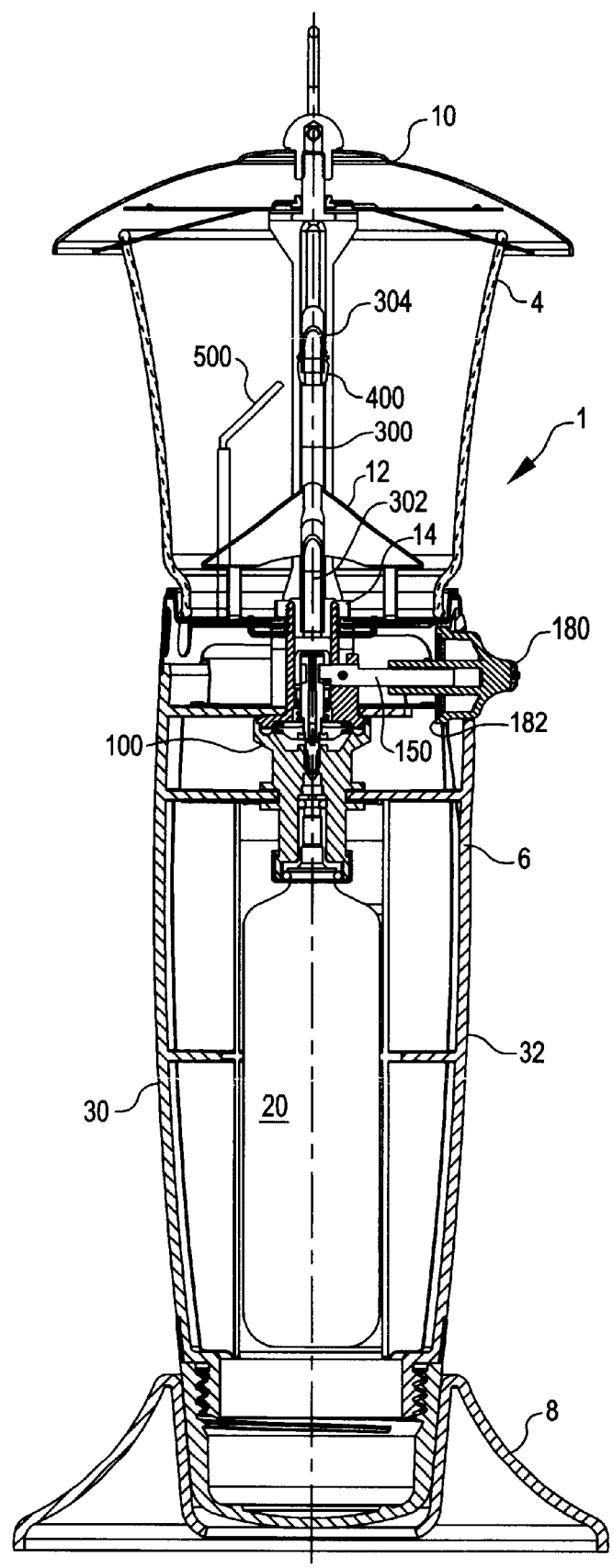
FIG. 1 illustrates a lantern according to one embodiment of the present invention.

FIG. 1 illustrates a lantern according to one embodiment of the present invention. The lantern 1 includes a regulator assembly 100, which provides a controlled flow of fuel from a fuel tank 20, mixes primary air with fuel, and which is connected to and provides an air/fuel mixture to a burner tube 300. The fuel tank 20 may be of known construction and connects to the regulator assembly 100 through known methods. The regulator assembly 100 preferably includes a valve stem 150 extending from the interior of the regulator assembly 100, allowing a user to control the flow of gas through the regulator assembly 100. A portion of the valve stem 150 may be covered by a knob 180 having a flange 182.

The burner tube 300 includes a lower opening 302 and an upper opening 304. The lantern 1 includes a preferably transparent glass globe 4 which encloses the burner tube 300. The burner tube 300 is attached to and provides an air/fuel mixture to a mantle 400, which glows to provide light when the lantern 1 is lit. The air/fuel mixture flows through the burner tube 300 and is combusted at the mantle 400, which glows to provide light. The mantle 400 may be implemented in a known way, such as a fabric impregnated with yttrium oxide. A ventilator cap 10 is arranged at the top of the lantern 1, above the globe 4. The globe 4 and burner sub-assembly are arranged on a housing 6 which houses fuel storage and delivery sub-systems, described more fully below, and which includes a base 8. Preferably, the housing 6 includes two halves 30 and 32.

Preferably, the burner tube 300 is inserted into a bushing 14 which is inserted into the output of the regulator assembly 100. The bushing 14, which is preferably formed of a plastic material, serves to support the burner tube 300 while thermally insulating the burner tube 300 from the regulator assembly 100, thereby minimizing heat transfer from the burner tube 300 to the regulator assembly 100. The burner tube 300 can readily be detached from the regulator assembly 100 by being pulled out of the bushing 14.

The mantle 400 is attached to the burner tube 300 in a known way, such as by tying the mantle 400 to a mantle holder (not shown) on the upper opening 304 of the burner tube 300 with a thread sewn around the opening of the mantle 400. The upper opening 304 is a burner tube outlet which provides an air/fuel mixture to the mantle 400.

Preferably a reflector 12, formed of stainless steel and having a substantially conical shape may be arranged at the base of the globe 4 and substantially surrounds the lower end of the burner tube 300. The reflector 12 redirects light that is cast downward from the mantle 400—light that would otherwise be lost—outward from the lantern 1, thereby providing more useful light (e.g., 10% more) to the lantern user. Additionally, the reflector 12 acts to shield the regulator assembly 100 from hot gases which may be emitted by the mantle 400.

In one embodiment, a mechanical lighting mechanism, described more fully below, is used to apply a flame or spark to the area near the mantle 400 to light the lantern 1. A spark wire 500 provides a spark when an igniter 510 (FIGS. 4, 5, 6) is operated by a cam follower 520 (FIGS. 4, 5, 6) and the knob 180.

Figure 2:
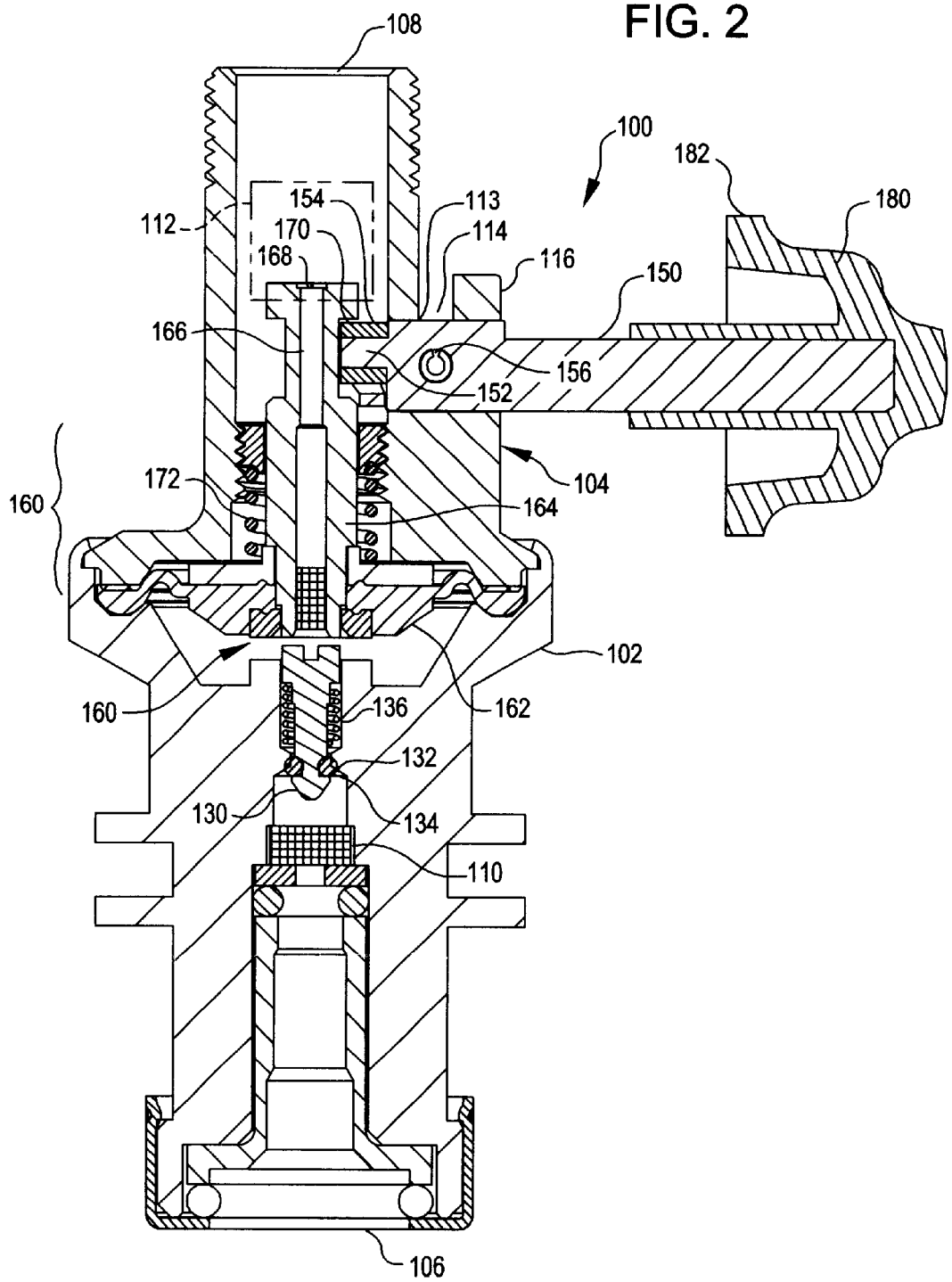
FIG. 2 is a cutaway view of the regulator assembly of FIG. 1 according to one embodiment of the present invention.

FIG. 2 is a cutaway view of the regulator assembly of FIG. 1 according to one embodiment of the present invention. The regulator assembly 100 acts to control the flow of gas and provide a constant flow of gas from the fuel tank 20 to the burner tube 300. The regulator assembly 100 includes a regulator body 102, a regulator top 104, a regulator input 106 and a regulator output 108. Gas enters the regulator input 106 and an air/fuel mixture flows out of the regulator output 108; the output of the regulator 100 may be mostly or completely gas if a choke is being operated. A filter 110 may be located near the bottom of the regulator assembly 100. An air opening 112 (shown in phantom in FIG. 2) allows air to enter the regulator assembly 100 and to mix with gas. In one embodiment, the air opening 112 is a square opening approximately 0.167 inch on each side. In alternate embodiments the shape of the air opening 112 may be different; for example a rectangle or circle, or may be formed from multiple openings. For example, the opening 112 may include openings on either side of the regulator assembly 100, or may be located elsewhere; for example on a tube or hose.

In one embodiment, the regulator assembly 100 includes a valve spool 130, seated in a valve spool opening 132, which provides a variable flow opening by opening and closing against an O-ring 134, also seated in the valve spool opening 132, to control the amount of gas flowing through the regulator assembly 100. The valve spool opening 132 is narrowed, possibly to the point of closing, as a valve spool spring 136 pushes the valve spool 130 against the O-ring 134, sealing or partially closing the valve spool opening 132. The valve spool opening 132 may be narrowed in varying amounts, including to the point where the valve spool opening 132 is completely closed. The valve spool opening 132 is a valve opening, the width of which may be varied by using a valve stop (the valve spool 130), varying the flow therethrough.

The valve spool opening 132 is opened or widened as a diaphragm assembly 160 pushes down on the valve spool 130. The diaphragm assembly 160 includes a preferably elastomer or rubber diaphragm 162, connected to a neck 164. A diaphragm spring 172 pushes against the regulator top 104 to press down on the diaphragm 162 and neck 164. The neck 164 of the diaphragm assembly 160 in turn presses down on the valve spool 130 to open or widen the valve spool opening 132. The neck 164 includes a neck passage 166, which is an axial fluid channel extending through the neck 164, with a gas tip 168 at its top. Gas flows through the neck passage 166 and exits through the gas tip 168. The gas tip 168 is a small hole, preferably approximately 3/1000 inch in diameter, which provides back pressure to the system, limits the amount of gas flowing through the regulator assembly 100, and provides velocity to the gas exiting the neck passage 166. Preferably, gas leaves the gas tip 168 at approximately 15 PSI.

In FIG. 2 the valve spool opening 132 is shown in the closed condition, and the regulator assembly 100 does not allow gas to pass through. In an alternate embodiment, a different method may be used to open or widen and close or narrow a valve; for example, a structure integral with the diaphragm assembly may be used. In further embodiments the diaphragm assembly may be of different structures and include different components.

Preferably, the regulator assembly 100 includes a valve stem 150 extending from the interior of the regulator assembly 100, through a valve hole 113. Preferably, the stem 150 extends from the side of the regulator assembly 100. A user may turn the valve stem 150 to control the flow of gas through the regulator assembly 100. A portion of the valve stem 150 may be covered by a knob 180, providing a handle for a user to turn the stem and, as explained further below, allowing the lighting mechanism and choke to be operated.

Preferably, the valve stem 150 includes a cam 152. A bushing or bearing 154 is rotatably mounted on the cam 152. The cam 152 and bearing 154 are off center relative to the axis of the valve stem 150, and engage a flange or lip 170 on the neck 164 to move the diaphragm assembly 160 and control the gas flow. The cam 152 is an axially off center extension or boss, located on the stem 150, which may be formed, for example by being machined and/or cast, or by other methods. The bearing 154 reduces the side load on the lip 170 of the valve stem 150 as the valve stem 150 is rotated and allows the stem 150 to be more easily turned against the lip 170 of the neck 164.

The valve stem 150 is held in place by a roll pin 156 extending out of the valve stem 150 and sliding in a groove 114 defined by an extension 116, which extends from the regulator top 104, and the body of the regulator top 104. The roll pin 156 also functions to keep the range of rotation of the valve stem within a certain range, for example 180 degrees. In alternate embodiments, the structure which engages the valve stem may differ; for example, an extending flange may be used. In further embodiments the valve stem may be of a different structure; for example a knob or lever may cause a structure such as a cam, extension or bushing to engage and move a diaphragm assembly.

Figure 3:
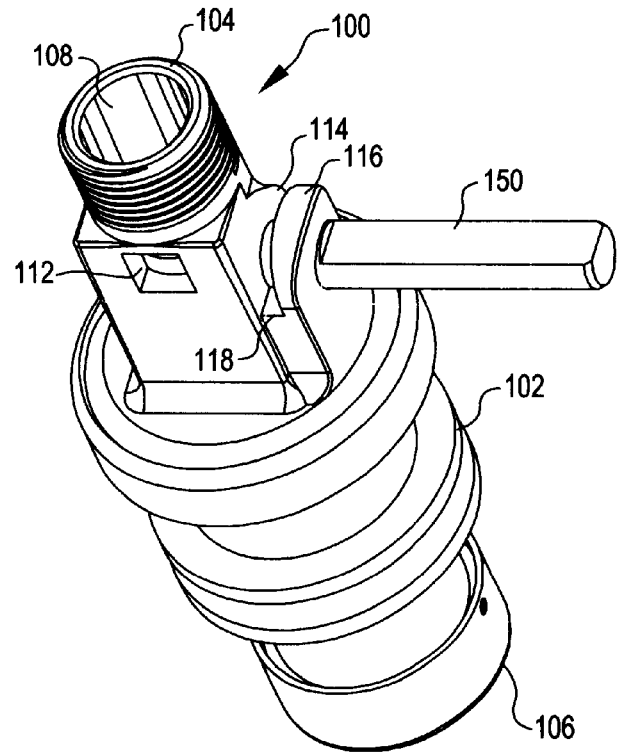
FIG. 3 is a perspective view illustrating the regulator assembly of FIG. 1 according to one embodiment of the present invention.

FIG. 3 is a perspective view illustrating the regulator assembly of FIG. 1 according to one embodiment of the present invention. In FIG. 3 the knob 180 is not depicted. The regulator assembly 100 includes the regulator body 102, the regulator top 104, the regulator input 106, the regulator output 108, and the air opening 112. The valve stem 150 is held in place by the roll pin 156 (FIG. 2) extending out of the valve stem 150 and sliding in the groove 114, defined by the extension 116 and the regulator top 104. The roll pin 156 also functions to limit the range of rotation of the valve stem by moving between a groove stop 118 and an opposite groove stop (not shown) on the other side of the groove 114.

In alternate embodiments the valve stem may be of a different structure. For example, the roll pin may not be required, and the valve stem may be held in place by different structures.

Referring to FIG. 2, when a user turns the stem 150 to a certain position, the cam 152 and bearing 154 push up on the lip 170, causing the neck 164 and the diaphragm assembly 160 to rise and causing the valve spool opening 132 to be closed by the valve spool 130. In such a manner, a user may cause the regulator assembly 100 to close, and to stop allowing gas to flow therethrough. The user may thus turn off the flow of gas through the lantern 1. When a user turns the stem 150 to a different position, the cam 152 and bearing 154 allow the neck 164 and thus the diaphragm assembly 160 to move downward under the bias of the spring 172, allowing the valve spool opening 132 to be opened. Preferably, in such a position the cam 152 and bearing 154 do not interfere with the normal operation of the regulator assembly 100.

In an alternate embodiment, the regulator assembly may have a different structure and a different set of components. For example, the container forming the regulator may be of one integral piece, or the bushing may be eliminated.

Locating the stem 150 to the side of the regulator assembly 100 allows the regulator assembly 100 to expel gas in a direction continuous with the direction which the gas enters the regulator assembly 100; e.g., gas may enter from the bottom of the regulator assembly 100 and an air/fuel mixture may exit the top. The gas flow does not travel in a circuitous path and does not have its path shifted. The stem 150 turns axially, thus avoiding a large, awkward sweep of motion that a movable handle may have. That the stem 150 is integral with the regulator assembly 100 and uses the diaphragm 162 as part of the on/off mechanism simplifies the overall mechanism and lowers the cost of the regulator assembly 100. In an alternate embodiment, the stem of the present invention may be used with a regulator expelling gas at another angle relative to the gas input; for example 90 degrees.

In one embodiment, the lantern 1 includes an ignition mechanism and choke mechanism which may be operated easily and substantially simultaneously, and which may be operated using the same control which operates the flow of gas through the regulator. A user may operate one control to start gas flow to the mantle, to cause a choke to richen the air/fuel mixture flowing to the mantle, and to cause an igniter to operate. While in one embodiment, this control is a knob which operates the regulator stem, a choke and an igniter, in alternate embodiments, the control may be of a different design. A user may turn the knob, and thus the regulator stem, to allow the flow of gas through the regulator, then push the knob and stem axially inward towards the regulator assembly to cause the choke to operate and to cause the ignition mechanism to light the gas flow. When the choke is being operated, the fuel/air ratio of the fuel flow output by the regulator is increased (i.e., the mixture is richer) and thus easier to ignite.

Once the gas flow is lit, the user releases the knob, turning off the choke mechanism and allowing the gas to mix with air so that the efficiency of the lantern 1 is increased. During normal operation, the fuel/air ratio of the fuel flow is optimized for lean, efficient burning, and is less than the fuel/air ratio during lighting. Since the air/fuel mixture may differ between lighting (rich) and normal operation (lean), the lantern 1 is both easy to light and efficient. Such a configuration allows a user to use one control and one series of motions to turn on the gas flow, operate the choke, and light the lantern 1. The user may use one hand to turn on gas flow, operate the choke and light the lantern, rather than using two hands at the same time.

Figure 4:
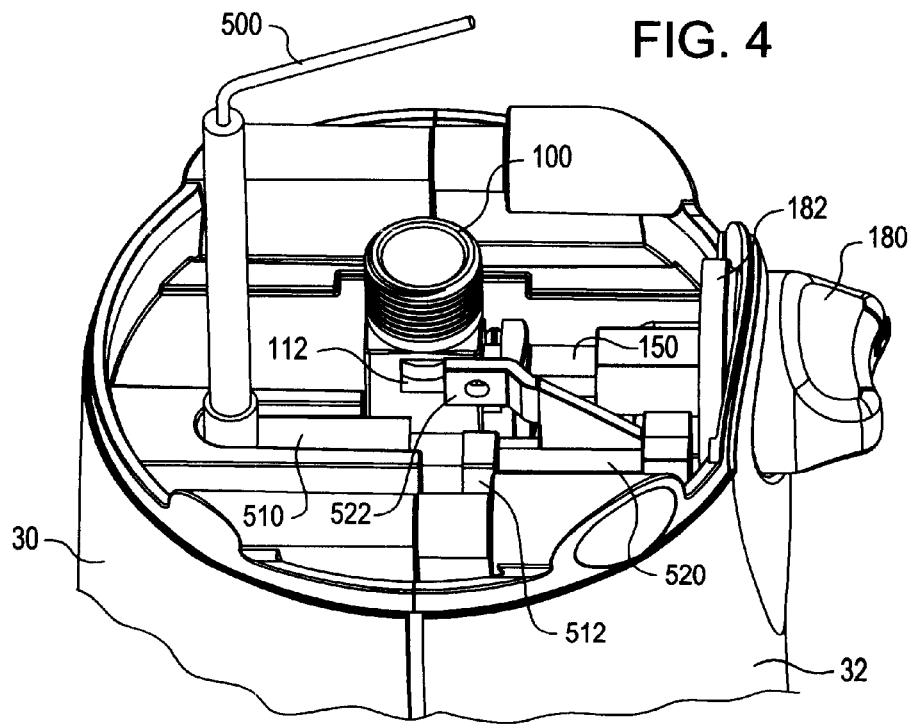
FIG. 4 is a cutaway view of a portion of the lantern of FIG. 1 according to one embodiment of the present invention.
Figure 5:
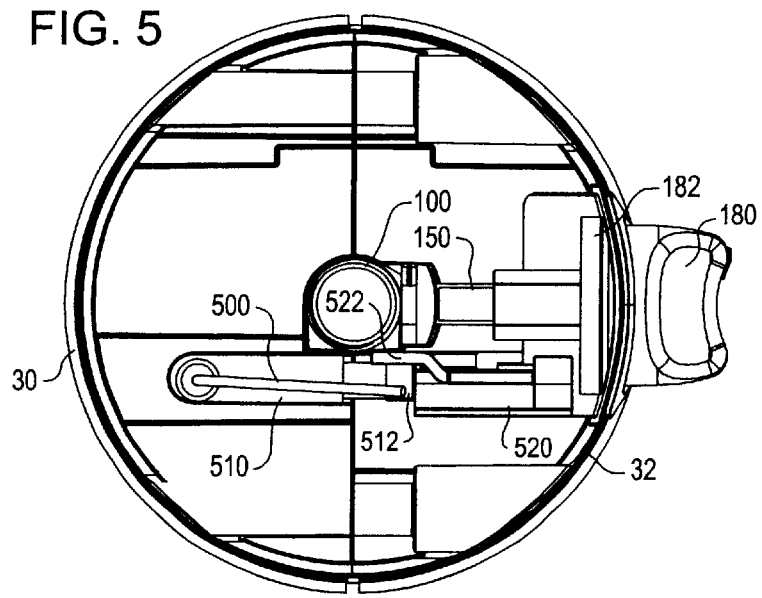
FIG. 5 is a cutaway plan view of a portion of the lantern of FIG. 1 according to one embodiment of the present invention.
Figure 6:
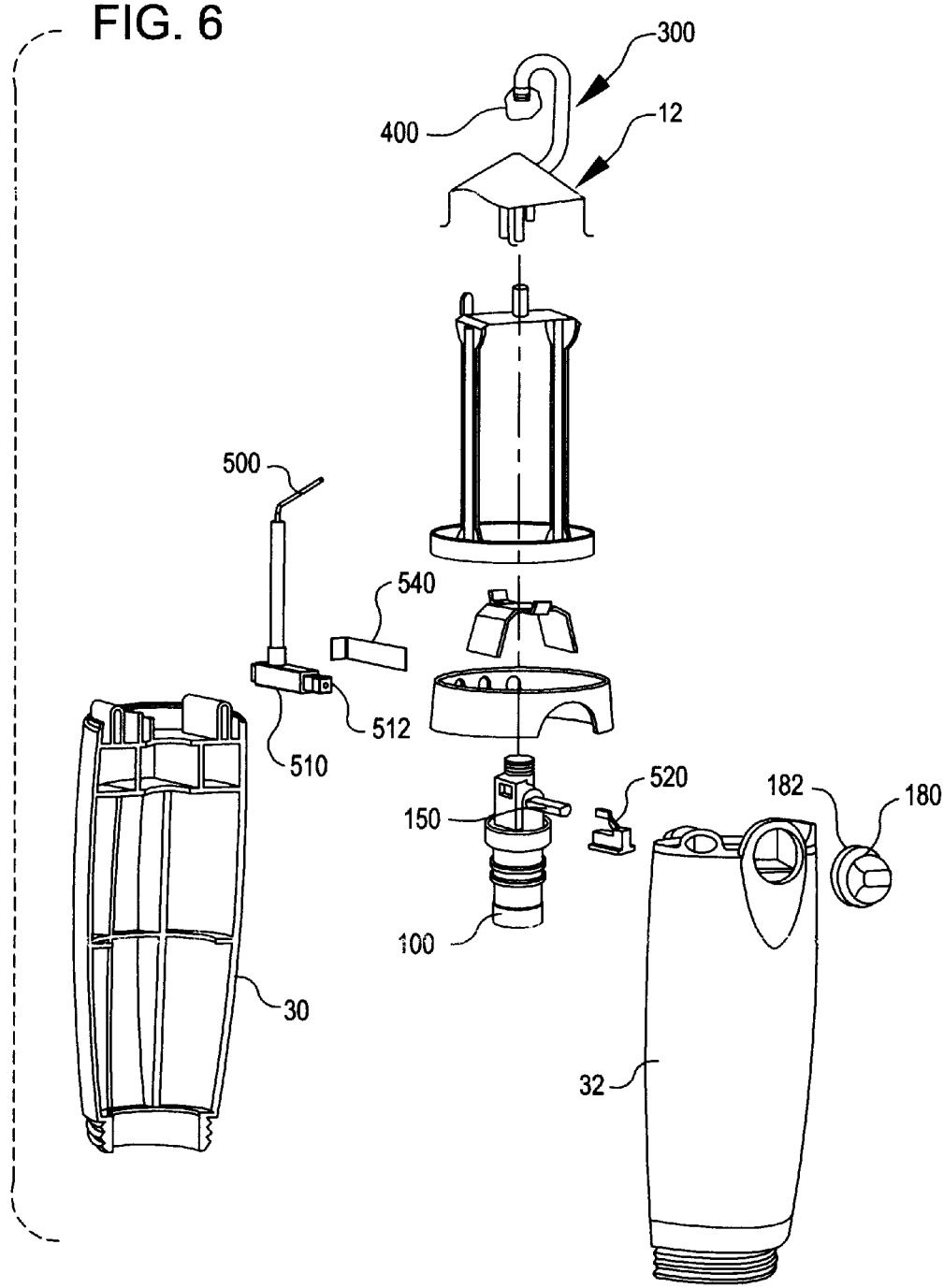
FIG. 6 is an exploded view of a portion of the lantern of FIG. 1 according to one embodiment of the present invention.

FIG. 4 is a cutaway view of a portion of the lantern of FIG. 1 according to one embodiment of the present invention. FIG. 5 is a cutaway plan view of a portion of the lantern of FIG. 1 according to one embodiment of the present invention. FIG. 6 is an exploded view of a portion of the lantern of FIG. 1 according to one embodiment of the present invention. Referring to FIGS. 4, 5 and 6, the regulator assembly 100, cam follower 520 and igniter 510 are held in place by two halves 30 and 32 of the housing 6. Preferably, the knob 180 is slidably mounted on the stem 150 of the regulator assembly 100. The knob 180 is retained on the stem 150, as the flange 182 is located on the inner portion of housing portion 32, and is wider than the opening on the housing portion 32 through which the knob 180 extends. In other embodiments, other methods of retaining the knob 180 on the stem 150 may be used. A user may turn the knob 180, and thus the stem 150 to cause gas to start to flow through the regulator assembly 100.

When the knob 180 is pressed inwards, the flange 182 of the knob 180 engages the cam follower 520, which slides in the same axial direction in which the knob 180 may slide, for example in a channel formed by the two halves 30 and 32 of the housing.

Figure 7:
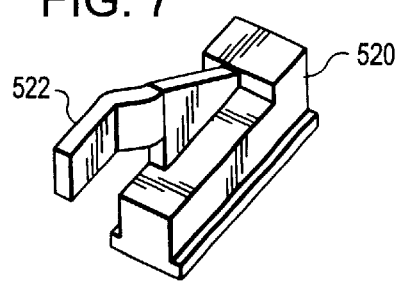
FIG. 7 is a perspective view depicting the cam follower of the lantern of FIG. 1 according to one embodiment of the present invention.
Figure 8:
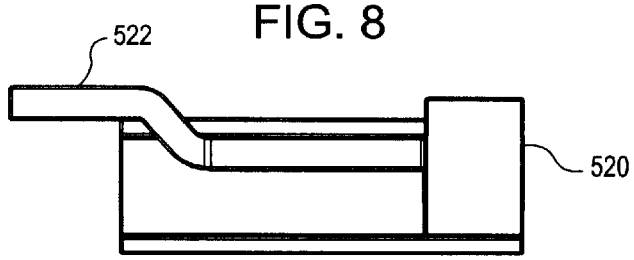
FIG. 8 is a plan view depicting the cam follower of the lantern of FIG. 1 according to one embodiment of the present invention.

FIG. 7 is a perspective view depicting the cam follower of the lantern of FIG. 1 according to one embodiment of the present invention. FIG. 8 is a plan view depicting the cam follower of the lantern of FIG. 1 according to one embodiment of the present invention. Referring to FIGS. 7 and 8, the cam follower 520 includes a choke member 522, an extension which may selectively substantially close the air opening 112 to richen the fuel/air mixture exiting the regulator assembly 100. Preferably, the air opening 112 is positioned so that it may be substantially blocked by the choke member 522 when the choke member 522 is operated. The cam follower 520 acts as a choke to cause the air/fuel mixture to richen; in alternate embodiments a choke of a different form may be used. When used herein, "substantially blocked" may include a condition where the air opening 112 is completely blocked or a condition where it is only partially blocked.

In alternate embodiments, the number and configuration of regulator air openings may differ; in such a case the choke may be of a different configuration and operate in a different manner. For example, a choke according to the present invention may occlude only certain of multiple air holes, or may include multiple choke members to occlude multiple air holes.

Figure 9:
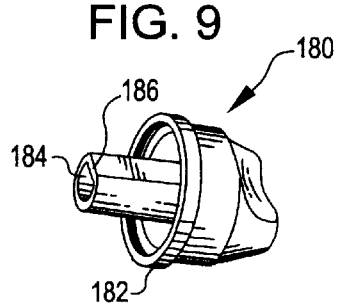
FIG. 9 depicts the knob of the lantern of FIG. 1 according to one embodiment of the present invention.

FIG. 9 depicts the knob of the lantern of FIG. 1 according to one embodiment of the present invention. Referring to FIG. 9, the knob 180 preferably includes an axial tube 184, which includes, for example, a flattened portion 186. Preferably, the shape of the axial tube 184 allows mating with the stem 150; the stem 150 includes a portion having a shape which mates with the flattened portion 186. Thus the knob 180 may be rotated to rotate the stem 150 but may slide axially along the stem 150 to operate a choke and an igniter. In alternate embodiments different combinations of movements may be used to operate the control. In further embodiments the shape of the axial tube and stem, and the method for allowing the knob to slide along and turn the stem, may be different.

Referring to FIGS. 4, 5 and 6, when the lantern 1 is fully assembled, the cam follower 520 engages the igniter plunger 512 of an igniter 510, providing an electric current to a spark wire 500. When a user presses on the knob 180, the knob flange 182 presses in the cam follower 520, which both acts as a choke, via the choke member 522, and activates the igniter 510 by pressing on the plunger 512, thus causing the spark wire 500 to ignite the enriched gas flow at the mantle 400. Preferably, the ground clip 540 electrically connects the igniter 510 and the regulator assembly 100. Preferably, the regulator assembly 100 is electrically connected to the burner tube 300; during ignition a spark leaps between the burner tube 300 and the spark wire 500. In alternate embodiments the choke and ignition apparatus according to the present invention may be used with a regulator other than that described herein.

The plunger 512 is spring activated, and is normally biased in its extended position. When a user presses on the knob 180 to press the plunger 512, the user works against this spring pressure. When the user releases the pressure, the spring activated plunger 512 forces the cam follower 520 outward to its non-choke position, moving the choke member 522 laterally so that the choke member 522 no longer blocks the air opening 112, and causing the knob 180 to slide outward along the stem 150 to its non-ignition position.

Preferably, the igniter 510 includes a piezoelectric igniter of known construction, and the spark wire 500 is an electrode of known construction. In alternate embodiments, the spark wire 500 may be any sort of spark or flame generating device, and the igniter 510 may be any sort of device capable of generating an appropriate pulse of electric current. Preferably, when the igniter plunger 512 is pressed the igniter 510 produces an electric current to cause a spark to occur between the spark wire 500 and the burner tube 300 near the mantle 400; this ignites a gas flow at the mantle 400. In alternate embodiments other ignition elements, not requiring an igniter or a spark generating device, may be used.

Preferably, the plunger 512 causes the igniter to emit an electric pulse after the choke member 522 has substantially blocked the air opening 112. The enriched fuel mixture flows from the regulator assembly 100 to the mantle 400 quickly. Thus, despite that the spark is generated very quickly after the choke mechanism is initially engaged, the spark ignites a substantially enriched fuel mixture. Preferably, there is a small amount of clearance in a slot between the top of the choke member 522 and top of the air opening 112, so that the choke member 522 does not completely block the air opening 112. Thus, even when the choke is fully engaged and the choke member 522 is extended along the air opening 112 as far as it may extend, a small amount of air enters the air opening 112. Preferably, the opening created by the gap or slot between the top of the choke member 522 and the air opening 112 is approximately 30/1000 inch wide. In alternate embodiments, the size or shape of the gap or slot causing the air opening 112 to be only partially occluded may differ, the gap may be in a different position, or the air opening 112 may be completely occluded. An additional opening may be included which is not occluded by the choke member to insure a minimum air intake.

In operation, gas pressure is provided from the fuel tank 20 (FIG. 1) to the regulator input 106. When the stem 150 is in an off position, no gas flows from the fuel tank 20 to the regulator assembly 100. When the user turns the knob 180, and thus the stem 150, gas flows from the fuel tank 20 in through the regulator input 106. Very quickly, the regulator assembly 100 provides a regulated gas flow at the regulator top 104. Preferably, proper operation requires the user to first turn the knob 180 without pressing in the knob 180; after the knob 180 is fully turned, the user presses the knob 180 to operate the choke member 522 and igniter 510, as described below. Thus, when the knob 180 is first turned, the choke member 522 will not restrict air flow through the air opening 112, and the gas flow through the regulator assembly 100 mixes with air entering the air opening 112. The lantern 1 may include a lock out mechanism preventing the knob 180 from being pressed inward until gas flow is started.

After the user turns the knob 180 to allow gas flow, but before gas flow is established, the diaphragm assembly 160 presses down on the valve spool 130, opening the valve spool opening 132. Gas flows through the valve spool opening 132, through the neck passage 166, and out of the gas tip 168. Air flows in through the air opening 112 to mix with the gas, and the air/fuel mixture flows out of the regulator output 108.

As gas flows through the valve spool opening 132 it presses against the diaphragm 162. The pressure on the diaphragm 162 counteracts the force of the diaphragm spring 172 and allows the diaphragm 162 to lift, easing the pressure of the diaphragm assembly 160 on the valve spool 130. The valve spool spring 136 closes the valve spool 130 to an extent, lowering the flow of gas through the regulator assembly 100, lowering the pressure on the diaphragm 162, and raising, in turn, the pressure of the diaphragm assembly 160 on the valve spool 130. This causes the valve spool opening 132 to be opened slightly. After a possible initial oscillation, the system quickly reaches equilibrium. The diaphragm 162 accepts a certain amount of gas pressure and transmits this pressure to the diaphragm spring 172. The diaphragm assembly 160 presses on the valve spool 130 to keep the valve spool opening 132 open a certain amount.

After the user turns the knob 180 to start gas flow through the regulator assembly 100, the user may light the lantern 1. The knob 180 is biased outward axially along the stem 150 by the spring action of the plunger 512, which in turn presses the cam follower 520 to press on the knob flange 182. To light the lantern 1, the user presses the knob 180 inward, causing the knob 180 to slide axially inward along the stem 150. The knob flange 182 presses on the cam follower 520, which moves to cause the choke member 522 to act as a choke by substantially occluding the air opening 112 and richening the fuel mixture flowing through the regulator assembly 100. The cam follower 520 presses the plunger 512. Preferably, when the air opening 112 is substantially occluded, the plunger 512 causes the igniter 510 to generate an electric current to cause the spark wire 500 to ignite the a flame at the mantle 400. The amount of gas released by the regulator assembly 100 may remain constant across various operating conditions. Thus the amount of gas flowing through the burner tube 300 remains constant regardless of the amount of air entering the air opening 112. Thus, when less air enters the air opening 112, the air/fuel mixture is richer. A richer air/fuel mixture is easier to light.

After lighting, the user releases the knob 180, which is pressed outward by the spring activated plunger 512. The choke member 522 no longer occludes the air opening 112, allowing air to mix with the gas flow through the regulator assembly 100, providing a lean, efficient, gas mixture at the mantle 400. A leaner air/fuel mixture is more efficient than a rich air/fuel mixture. A fuel mixture flows from the regulator assembly 100 into the burner tube 300 through the lower opening 302, through the burner tube 300, out of the upper opening 304 and into the mantle 400, where it burns to cause the mantle 400 to glow and provide light.

If a user wishes to turn off the lantern 1 by stopping the flow of gas through the regulator assembly 100, the user rotates the knob 180 and thus the valve stem 150. The cam 152 and bearing 154 engage the lip 170 on the neck 164 and lift the neck 164, causing the diaphragm assembly 160 to stop pressing down on the valve spool 130 and thus causing the valve spool 130 to close the valve spool opening 132. When the user rotates the knob 180 and stem 150 in the opposite direction, the cam 152 and bearing 154 move and disengage with the neck 164, allowing the diaphragm assembly 160 to fall and thus allowing the valve spool opening 132 to be opened.

Preferably, the diaphragm 162 and O-ring 134 are constructed of elastomer or rubber. The regulator body 102 and the regulator top 104 may be constructed of zinc. Other parts, such as the stem 150 or neck 164, may be constructed of a metal such as brass. The various springs may be constructed of music wire. The two halves of the body 30 and 32, the cam follower 520, and the knob 180 may be constructed of plastic. Alternately, the materials used may be different. For example, other metals may be used, as appropriate.

While the lantern of the present invention is described with respect to specific embodiments, it should be noted that the present invention may be implemented in different manners and used with different applications. For example, while the novel regulator assembly, choke and ignition devices are described as being used in a lantern with flammable gas, such a regulator, choke or igniter may be used with other applications, such as in stoves or welding devices. The regulator of the present invention may be used with any sort of gas, whether flammable or non-flammable, for example in devices such as air tanks or oxygen tanks. In an alternate embodiment, the lantern according to an embodiment may be of a different configuration and may contain different components. The air intake hole blocked by the choke may be located on a different part of the fuel delivery apparatus; for example, the air hole may be located in a fuel delivery tube rather than on the regulator.

What is claimed is:

1. A fuel delivery apparatus for a gas operated appliance including a burner tube and an igniter operable to ignite a fuel flow exiting the burner tube, the fuel delivery apparatus comprising:

a regulator having an air intake opening and providing a fuel flow to the burner tube;

a choke selectively movable to open the air intake opening after ignition of fuel and movable to substantially close the air intake opening during ignition of fuel;

a regulator and choke control including a first control mechanism movable by a user to operate the regulator to cause gas to flow through the regulator, and a second control mechanism movable to operate the igniter, and movable to operate the choke; and wherein the regulator and choke control is rotatable to operate at least one of the first control mechanism and the second control mechanism and movable in an axial direction to operate at least one of the other of the first control mechanism and the second control mechanism.

2. The fuel delivery apparatus of claim 1 wherein when the regulator and choke control is moved in a first direction, the first control mechanism operates the regulator, and wherein when the regulator and choke control is moved in a second direction, the second control mechanism operates the igniter and choke.

3. The fuel delivery apparatus of claim 1 wherein the regulator and choke control includes a stem.

4. The fuel delivery apparatus of claim 1 wherein:

the igniter includes a plunger;

the choke engages the plunger; and the second control mechanism engages the choke.

5. The fuel delivery apparatus of claim 1 wherein, when a user operates the second control mechanism, the regulator and choke control moves axially, and the second control mechanism causes the choke to press the plunger and operate the igniter.

6. The fuel delivery apparatus of claim 1 wherein the flow of gas exits the regulator in substantially the same direction as the flow of gas enters the regulator.

7. The fuel delivery apparatus of claim 1, wherein the choke includes an extension which may selectively substantially close the opening.

8. The fuel delivery apparatus of claim 1, wherein the igniter provides an electric current to a spark wire.

9. The fuel delivery apparatus of claim 1, wherein the regulator comprises:

a valve opening;

a valve stop closing and opening the valve opening; and a diaphragm assembly including at least a diaphragm, the diaphragm assembly moving the valve stop to open and narrow the valve opening;

wherein the first control mechanism acts to move the diaphragm assembly to cause the valve opening to narrow.

10. A gas operated appliance comprising:

a fuel delivery apparatus;

a burner tube receiving a fuel flow from the fuel delivery apparatus;

an air opening providing air to the fuel delivery apparatus;

a choke selectively movable to substantially close the air opening during ignition of fuel;

an igniter operable to ignite the fuel flow exiting the burner tube;

a regulator and choke control including a first control mechanism movable by a user to operate the fuel delivery apparatus to cause gas to flow therethrough, and a second control mechanism that is movable to operate the igniter, and movable to operate the choke; and wherein the regulator and choke control is rotatable to operate at least one of the first control mechanism and the second control mechanism and movable in an axial direction to operate at least one of the other of the first control mechanism and the second control mechanism.

11. The gas operated appliance of claim 10 wherein when the regulator and choke control is moved in a first direction, the first control mechanism operates the regulator, and wherein when the regulator and choke control is moved in a second direction, the second control mechanism operates the igniter and choke.

12. The gas operated appliance of claim 10 wherein the regulator and choke control includes a stem.

13. The gas operated appliance of claim 10 wherein:

the igniter includes a plunger;

the choke engages the plunger; and the second control mechanism engages the choke.

14. The gas operated appliance of claim 10 wherein, when a user operates the second control mechanism, the regulator and choke control moves axially, and the second control mechanism causes the choke to press the plunger and operate the igniter.

15. The gas operated appliance of claim 10, wherein the choke includes an extension which may selectively substantially close the air opening.

16. The gas operated appliance of claim 10, wherein the igniter provides an electric current to a spark wire.

17. The gas operated appliance of claim 10 wherein the fuel delivery apparatus includes a regulator.

\* \* \* \* \*